J. H. SMITH.
Petroleum Filter.
No. 66,645.
Patented July 9, 1867.
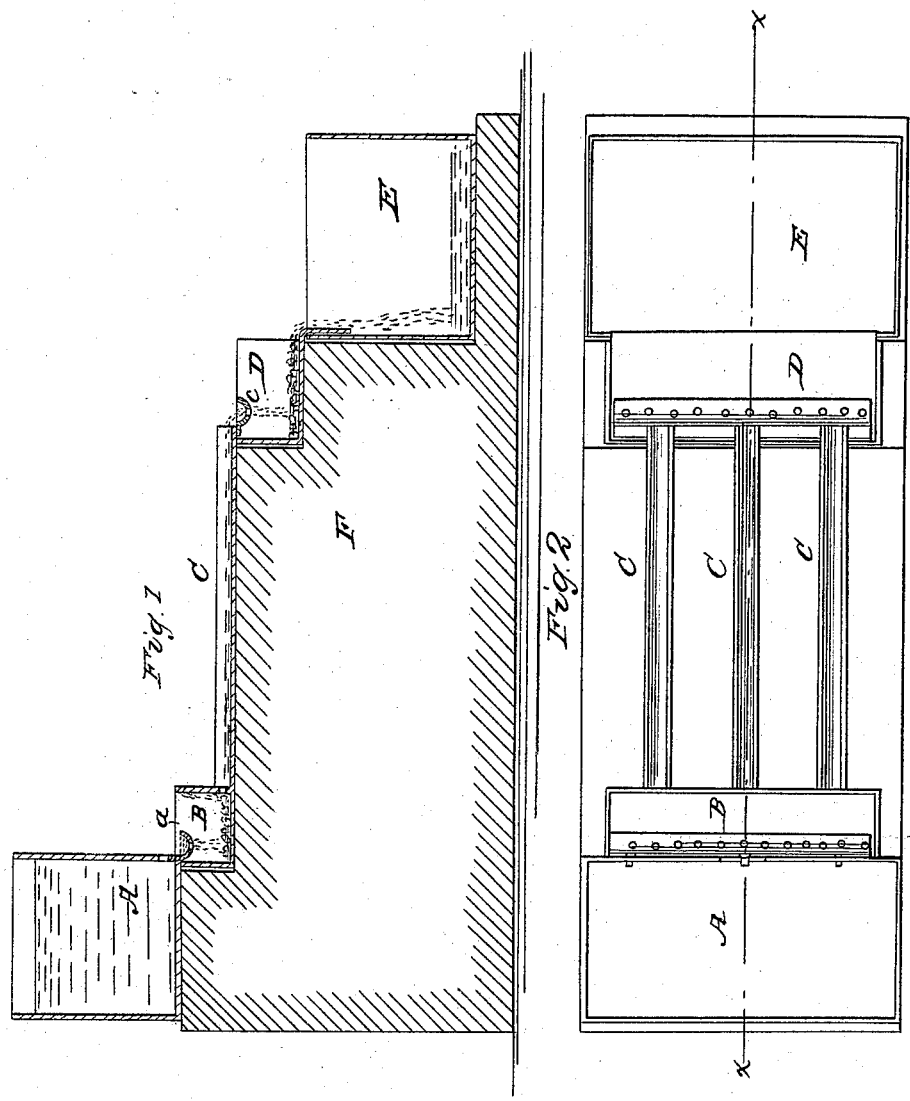

United States Patent Office.

J. HENRY SMITH, OF PITTSBURG, PENNSYLVANIA.

Letters Patent No. 66,645, dated July 9, 1867.

---

IMPROVED PETROLEUM-FILTER.

---

The Schedule referred to in these Letters Patent and making part of the same.

---

TO ALL WHOM IT MAY CONCERN:

Be it known that I, J. HENRY SMITH, of Pittsburg, Allegheny county, Pennsylvania, have invented a new and improved Petroleum-Filter; and I do hereby declare that the following is a full, clear, and exact description thereof, which will enable others skilled in the art to make and use the same, reference being had to the accompanying drawings forming part of this specification.

This invention relates to a new and improved method of filtering and purifying petroleum; and it consists in passing it through filtering-pans, containing proper filtering materials, as will be hereinafter described.

Figure 1 represents a vertical longitudinal section of my filtering apparatus, showing the tanks, the filtering-pans and the troughs.

Figure 2 is a top or plan view of the same.

Similar letters of reference indicate corresponding parts.

A is a tank or vessel, into which the petroleum is first placed. B is a pan which first receives the petroleum from the tank A. C represents the troughs which receive the petroleum from the pan B. D is the filtering-platform. E is a tank, from which the purified oil is taken. F is the platform which supports the apparatus. The petroleum is discharged from the tank A, through spigots or faucets, into a distributing-spout, a, which spout is perforated by holes at suitable distances apart. From this spout the liquid falls into the filtering-pan B. This pan is provided with suitable filtering material, through which the liquid passes, and is discharged into the troughs C, which convey it to the filtering-platform D, through another distributing-spout marked c. The platform D is also provided with filtering material which retains whatever impurities may remain in the oil. From this apron it is discharged into the tank E, from whence it is taken in a condition suitable for lubricating or other purposes. In this method the crude petroleum is allowed to pass or drip slowly from the tank A to the tank E, so that it becomes thoroughly purified and prepared as above stated.

I do not confine myself to any particular number of distributing-spouts or gutters, filtering-pans, conducting-troughs, or filtering-platforms; but what I do claim, and desire to secure by Letters Patent, is—

The perforated distributing-spout a, filter B, troughs C, distributing-spout c, and filtering-platform D, all arranged in relation with each other and with the tanks A E, in such a manner that the oil may be filtered and evaporated by passing from a fine shower to sluggish streams, as and for the purpose specified.

The above specification of my invention signed by me this twenty-first day of March, 1867.

J. HENRY SMITH.

Witnesses:
J. DONALDSON,
JOHN LUTZ.